Patented Mar. 8, 1938

2,110,848

UNITED STATES PATENT OFFICE 2,110,848

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application June 21, 1937, Serial No. 149,471

11 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by my process consists of or comprises a substituted aromatic sulfonic acid body of the kind in which the aromatic nucleus which may be monocyclic or dicyclic, contains an interrupted alkyl radical of the kind hereinafter described. Commercial demulsifying agents employed for breaking or resolving oil field emulsions include among other substances, substituted monocyclic or polycyclic aromatic sulfonic acids or their salts. Sometimes materials such as sulfonated cymene, sulfonated diamyl benzene or sulfonated amylated phenol are employed. However, the type which finds most frequent application is obtained by introducing one, two, or more alkyl groups into a polycyclic residue, such as a naphthalene residue or an anthracene residue, or a phenanthrene residue. The majority of reagents are derived from naphthalene because it produces a very effective treating agent, and because of its low cost. It is immaterial whether the alkyl radicals are introduced into the naphthalene nucleus and the product subsequently sulfonated, or if the alkyl groups are introduced into the naphthalene sulfonic acids, or similar sulfonic acids. Due to the corrosiveness of the sulfonic acids, the usual practice is to employ the reagent in the form of a salt, such as ammonium salt, potassium salt, sodium salt, or in the form of various amine salts of the kind hereinafter referred to.

I have found that if, instead of substituting an uninterrupted alkyl radical into the aromatic nucleus, whether monocyclic or polycyclic, one may obtain a more effective demulsifying agent in many instances by the introduction of an interrupted alkyl radical. For sake of illustration, I shall refer to compounds derived from naphthalene as the source of the aromatic nucleus, although as previously pointed out, such compounds may be derived from benzene, toluene, xylene, cymene, and the like, or may be derived from other polycyclic materials, in addition to naphthalene. Furthermore, for sake of brevity, I shall refer to the manufacture of these materials from alcohols by formation of the acid sulfate or else from the chlorhydrins or halides with the liberation of hydrochloric acid. It is understood, however, that sulfo-aromatic materials of the kind employed as demulsifying agents in the present process, may be made in any suitable manner, and there is no limitation in regard to the method of manufacture.

The method of manufacture of the compounds of the kind contemplated for use as demulsifying agents in the present process are analogous to the methods employed in the manufacture of ordinary alkylated naphthalene sulfonic acids and the like. These processes are well known, but for convenience, reference is made to U. S. Patent #2,077,229, dated April 13, 1937, to Melvin De Groote and Arthur F. Wirtel, page 5, right-hand column, line 11, extending through page 6, left-hand column, line 58.

It is obvious that if in place of an alcohol or an olefine, or an alkyl halide, one employs a monohydric alcohol derived from the etherization of glycols, the same sort of reactions can be conducted as described previously, with the difference that one introduces an interrupted alkyl radical instead of the uninterrupted alkyl radical. This will be illustrated by specific examples.

Ethylene glycol,

can be reacted with methyl alcohol to yield the methyl ether of the formula type:

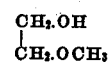

Similarly, it may be reacted to produce the ethyl ether of the formula type:

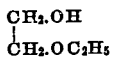

or it can be reacted with propyl alcohol to produce a propyl ether of the formula type:

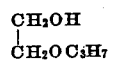

Similarly, it may be reacted with butyl alcohol to produce a material of the formula type:

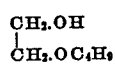

Similar alcohol ethers can be derived from amyl alcohol, hexyl alcohol, octyl alcohol, and decyl alcohol. However, the starting point, instead of being ethylene glycol, may be any polymethylene ether, in which instance the alkyl chain may be interrupted by at least two oxygen atoms. Diethylene glycol is indicated by the following formula:

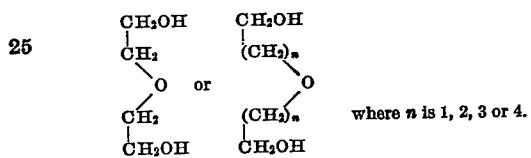 where $n$ is 1, 2, 3 or 4.

The monoethyl ether of diethylene glycol is indicated by the following formula:

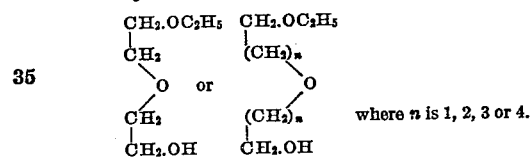 where $n$ is 1, 2, 3 or 4.

It is obvious that instead of having the monoethyl ether, one could have the corresponding ether alcohol derived from methyl alcohol, propyl alcohol, butyl alcohol, amyl alcohol, hexyl alcohol, octyl alcohol, etc. Similarly, another example of a polymethylene glycol is triethylene glycol, indicated by the following formula:

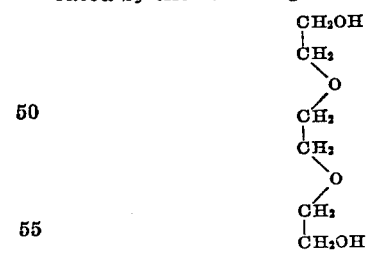

Ether alcohols can be prepared from triethylene glycol by reaction with methyl alcohol, ethyl alcohol, propyl alcohol, butyl alcohol, amyl alcohol, hexyl alcohol, octyl alcohol, etc. Furthermore, one could employ tetraethylene glycol, pentaethylene glycol, etc. In all these various instances, one has an alkyl radical interrupted by one or more oxygen atoms. The compounds have the property of an alcohol and will produce an acid sulfate by reaction with sulfuric acid, or other suitable material such as gaseous sulfur trioxide, chlorosulfonic acid, etc. Furthermore, the hydroxyl can be removed by usual procedures, so as to be replaced by a chlorine atom. Such halide derivatives could be reacted with aromatic material such as naphthalene, in presence of a suitable condensing agent, such as aluminum chloride, to yield the same sort of material as would be obtained by reacting naphthalene with the acid sulfate derived from the alcohol. Such a product may be submitted to a subsequent sulfonation process.

However, if a mercaptan or thioalcohol of the formula type RSH is reacted with ethylene glycol or with ethylene chlorhydrin, there is formed a compound of the type $R-S-(CH_2)_2OH$. Mercaptans or thioalcohols can be prepared by the action of potassium hydrogen sulfide on a halogen compound, such as ethyl iodide, propyl iodide, hexyl iodide, amyl iodide, etc., or by the action of phosphorus pentasulfide on an alcohol, such as ethyl alcohol, propyl alcohol, butyl alcohol, amyl alcohol, hexyl alcohol, octyl alcohol, etc. Amyl mercaptan is available commercially, because of its use as a warning agent in toxic gases. Various alkyl mercaptans appear naturally in certain petroleum products, and undoubtedly mercaptans isolated from petroleum products could be utilized to advantage to supply the interrupted alkyl radical. It is interesting to note that some mercaptans, such as myricyl mercaptan ($C_{30}H_{61}SH$), if of a fairly high molecular weight, are substantially odorless.

It is obvious that the mercaptans can combine not only with ethylene glycol or its functional equivalents, but also with diethylene glycol, triethylene glycol, tetraethylene glycol, pentaethylene glycol, etc., or their equivalents. In the combination, for example, between a polyethylene glycol and a mercaptan, the resultant product would represent an alkyl chain which had been interrupted by both an oxygen atom and a sulfur atom.

Materials of the kind above described, whether derived from the various glycols or the glycol chlorhydrins, may be referred to as alkyl alkylol sulfides. The mercaptan from which they are derived furnishes the alkyl group, and the glycol furnishes the alkylol group. In some instances a glycol will furnish an interrupted alkylol group, although as previously pointed out, this is not objectionable, insofar that eventually it will result in an alkylol chain being interrupted by at least one oxygen atom and a sulfur atom. Such compounds, which will be referred to generically as alkyl alkylol sulfides, can be converted into acid sulfates by the usual reactions involving sulfuric acid, gaseous sulfur trioxide, chlorosulfonic acid, etc. After being converted into corresponding acid sulfate, such compounds may be reacted with naphthalene, for instance, or with naphthalene sulfonic acid, in the same manner that one would employ the acid sulfates derived from the various alkyloxyethyl alcohols previously described.

Not only may the alkyl chain be interrupted by an oxygen atom or sulfur atom in the manner previously disclosed, but it may also be interrupted by a nitrogen atom or by a nitrogen atom in combination with a single hydrogen atom (imino grouping). For instance, if propyl phenol ethyl chloride is condensed with diamylamine, as indicated by the following reaction:

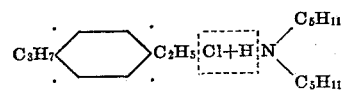

the product can be sulfonated to yield a sulfonic acid of the composition indicated by the formula:

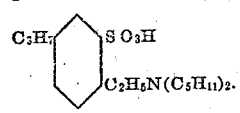

Similarly, reaction between dipropylnaphthyl ethyl chloride and monoamylamine with subsequent sulfonation would yield a material of the following formula:

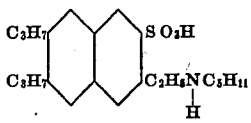

For sake of convenience, reference to interruption by a nitrogen atom is intended to mean either the nitrogen atom or the imino radical =N—H. It is to be noted that amines derived from higher fatty acids or higher fatty alcohols, having sixteen to twenty-two carbon atoms may be employed. Such amines may be primary or secondary.

The substituted naphthalene sulfonic acids of the kind contemplated for use in the present process are most suitably derived from naphthalene. There does not appear to be any advantage in the use of a naphthalene derivative such as chlornaphthalene, alpha and beta naphthol, etc. In other words, one could introduce the sulfonic acid residue into interrupted alkyl residue and a substituted naphthalene, such as chlornaphthalene, etc., just as readily, perhaps, as in the case of naphthalene. Such simple derivatives are, of course, the chemical equivalent of naphthalene in the manufacture of such sulfonic acids as employed in the production of the present reagent. It is understood that the word "naphthalene" is hereinafter employed to include all these derivatives.

It is understood that in addition to introducing such interrupted alkyl residues as the kind described, into the monocyclic or polycyclic, aromatic nucleus, one could also introduce a residue of some other kind, such as an uninterrupted alkyl residue derived from methyl alcohol, ethyl alcohol, propyl alcohol, butyl alcohol, amyl alcohol, hexyl alcohol, decyl alcohol, etc. Similarly, one might introduce a group derived from an aryl, aralkyl, hydroaromatic, or alicyclic alcohol or the like. But regardless of whether or not one introduces such other residues, it is necessary that at least one interrupted alkyl residue of the kind described be introduced into the monocyclic or polycyclic aromatic ring. Such compounds having some other group present, such as a methyl group, might be considered as being derived from methyl naphthalene, instead of the naphthalene, and thus would fall within the class of chemical equivalents previously noted. It is immaterial as to the particular alcohol employed or the particular isomeric form of the alcohol employed, although generally speaking, it is most desirable to use the one lower in cost.

It is obvious that a large number of isomers can be produced in the manufacture of the reagent employed in the present process. For instance, although the sulfonic group may be introduced into either the alpha or beta position, it is manifest that the alkyl group or groups can be introduced into various positions in regard to the position of the sulfonic acid residue. Apparently, as far as I am aware, one isomeric form is as effective as the other. Reference to the compounds is not intended to indicate any particular isomer, unless the text clearly indicates some specific position. More than one sulfonic acid radical may be introduced into the aromatic nucleus.

As in the manufacture of alkylated naphthalene sulfonic acids or the like, the completion of the desired primary reactions in the manufacture of interrupted alkylated aromatic sulfonic acids is followed by a washing process which removes the excess of sulfuric acid or other sulfonation, sulfation, or condensation agents employed. The acidic mass thus obtained is neutralized with various amines in the same manner that sodium or potassium or ammonium hydroxides might usually be employed. The final product, if it represents a pasty or semi-solid or a solid mass, is rendered suitable for industrial use by the addition of a solvent, such as water, an alcohol, a coal tar solvent, a petroleum hydrocarbon solvent, or in any similar manner.

Ethylene glycol may be considered as hydroxy ethyl alcohol. Similarly, the ether derived from dehydration of butyl alcohol and ethylene glycol may be considered as butyloxyethyl alcohol, the $C_4H_9O$ radical replacing a hydrogen atom of ethyl alcohol.

My preferred reagent is prepared by converting butyloxyethyl alcohol,

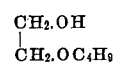

into the acid sulfate, which may be indicated by the following formula: $C_4H_9O.CH_2CH_2HSO_4$. Two moles of the butyloxyethyl hydrogen sulfate so prepared, are reacted with one mole of naphthalene in presence of a suitable condensing agent, such as sulfuric acid, and preferably sulfonated at the same time, so as to give a compound of the following composition:

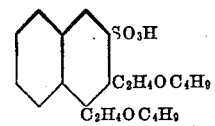

The material may be used as such in the acidic form, or may be neutralized in the manner previously described by the use of caustic soda, caustic potash, various amines, etc. Incidentally, it is understood that the various formulas herein included are for purposes of illustration and are not intended to refer to any specific isomeric form. In such instances where amines are employed either for neutralization or for alkylation, it is to be emphasized that amines from fatty acids having approximately sixteen to twenty-two carbon atoms, may be employed. Reference has been made to alcohols having approximately eight or ten carbon atoms, but it is obvious that one may use alcohols having ten, twelve, sixteen, or eighteen carbon atoms. Some of the alcohols of this kind are derived from fatty materials and include such alcohols as oleyl alcohol, stearyl alcohol, ricinoleyl alcohol, and similar alcohols, such as naphthenyl alcohol. Thus the interrupted carbon atom chain may contain at least forty carbon atoms, as in instances where a polymethylene glycol and erucyl alcohol are employed. In calculating the number of carbon atoms in a branched alkyl radical, only the carbon atoms in the longer or longest branch are counted.

In the manufacture of the preferred reagent of the kind above described, undoubtedly in addition to the di-substituted product, some mono-substituted and some trisubstituted compound is also formed and with the likelihood that a small proportion of the tetrasubstituted material is also formed. If desired, one could add one mole of butyloxyethyl hydrogen sulfate to one mole of naphthalene and conduct the condensation and sulfonation in the usual manner. Likewise, one might add three moles of butyloxyethyl hydrogen sulfate to one mole of naphthalene and proceed with the usual reactions. There is no reason why the reaction need to be controlled so as to yield only one specific substitution product. Incidentally, for neutralization, one may employ complex amines of the kind described in U. S. Patent #2,077,229, to De Groote and Wirtel, dated April 13, 1937; U. S. Patent #2,007,746, to De Groote and Wirtel, dated April 20, 1937; application for Letters Patent, Serial No. 101,433, filed by De Groote and Wirtel on September 18, 1936; and application for Letters Patent, Serial No. 101,434, filed by De Groote and Wirtel on September 18, 1936.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, in which the sulfonic hydrogen is neutralized by the use of some base other than polyhydric alcohol substituted amines of the kind contemplated in the present process.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited applicaiton, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practicing my process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

Having thus described my invention, what I claim as new and desire to secure by Letters Patent is:

1. A process for breaking petroleum emulsions of the water-in-oil type, which consists in subjecting the emulsion to the action of a demulsifying agent comprising a nuclear substituted aromatic sulfonic acid compound of the kind in which the substituted aromatic nucleus contains at least one interrupted alkyl radical in a nuclear hydrogen atom position; said interrupted alkyl radical containing not more than forty carbon atoms and characterized by being interrupted at least once by an atom selected from the class consisting of sulfur, nitrogen and oxygen atoms.

2. A process for breaking petroleum emulsions of the water-in-oil type, which consists in subjecting the emulsion to the action of a demulsifying agent comprising a nuclear substituted polycyclic aromatic sulfonic acid compound of the kind in which the substituted aromatic nucleus contains at least one interrupted alkyl radical in a nuclear hydrogen atom position; said interrupted alkyl radical containing not more than forty carbon atoms and characterized by being interrupted at least once by an atom selected from the class consisting of sulfur, nitrogen and oxygen atoms.

3. A process for breaking petroleum emulsions of the water-in-oil type, which consists in subjecting the emulsion to the action of a demulsifying agent comprising a nuclear substituted polycyclic aromatic sulfonic acid compound derived from naphthalene and of the kind in which the substituted aromatic nucleus contains at least one interrupted alkyl radical in a nuclear hydrogen atom position; said interrupted alkyl radical containing not more than forty carbon atoms and characterized by being interrupted at least once by an atom selected from the class consisting of sulfur, nitrogen and oxygen atoms.

4. A process for breaking petroleum emulsions of the water-in-oil type, which consists in subjecting the emulsion to the action of a demulsifying agent comprising a nuclear substituted polycyclic aromatic sulfonic acid compound derived from naphthalene and of the kind in which the substituted aromatic nucleus contains at least one interrupted alkyl radical in a nuclear hydrogen atom position; said interrupted alkyl radical containing not more than forty carbon atoms and characterized by being interrupted at least once by a sulfur atom.

5. A process for breaking petroleum emulsions of the water-in-oil type, which consists in subjecting the emulsion to the action of a demulsifying agent comprising a nuclear substituted polycyclic aromatic sulfonic acid compound derived from naphthalene and of the kind in which the substituted aromatic nucleus contains at least one interrupted alkyl radical in a nuclear hydrogen atom position; said interrupted alkyl radical containing not more than forty carbon atoms and characterized by being interrupted at least once by a nitrogen atom.

6. A process for breaking petroleum emulsions of the water-in-oil type, which consists in subjecting the emulsion to the action of a demulsifying agent comprising a nuclear substituted polycyclic aromatic sulfonic acid compound derived from naphthalene and of the kind in which the substituted aromatic nucleus contains at least one interrupted alkyl radical in nuclear hydrogen atom position; said interrupted alkyl radical containing not more than forty carbon atoms and characterized by being interrupted at least once by an oxygen atom.

7. A process for breaking petroleum emulsions of the water-in-oil type, which consists in subjecting the emulsion to the action of a demulsifying agent comprising a nuclear substituted polycyclic aromatic sulfonic acid compound derived from naphthalene and of the kind in which the substituted aromatic nucleus contains at least two interrupted alkyl radicals in nuclear hydrogen atom positions; said interrupted alkyl radicals containing not more than forty carbon atoms and characterized by being interrupted at least once by an oxygen atom.

8. A process for breaking petroleum emulsions of the water-in-oil type, which consists in subjecting the emulsion to the action of a demulsifying agent comprising a nuclear substituted polycyclic aromatic sulfonic acid compound derived from naphthalene and of the kind in which the substituted aromatic nucleus contains at least two interrupted alkyl radicals in nuclear hydrogen atom positions; said interrupted alkyl radicals containing not more than twenty carbon atoms and characterized by being interrupted at least once by an oxygen atom.

9. A process for breaking petroleum emulsions of the water-in-oil type, which consists in subjecting the emulsion to the action of a demulsifying agent comprising a nuclear substituted polycyclic aromatic sulfonic acid salt derived from naphthalene and of the kind in which the substituted aromatic nucleus contains at least two interrupted alkyl radicals in nuclear hydrogen atom positions; said interrupted alkyl radicals containing not more than twenty carbon atoms and characterized by being interrupted at least once by an oxygen atom.

10. A process for breaking petroleum emulsions of the water-in-oil type, which consists in subjecting the emulsion to the action of a demulsifying agent comprising a nuclear substituted polycyclic aromatic sulfonic acid water-soluble salt derived from naphthalene and of the kind in which the substituted aromatic nucleus contains at least two interrupted alkyl radicals in nuclear hydrogen atom positions; said interrupted alkyl radicals containing not more than twenty carbon atoms and characterized by being interrupted at least once by an oxygen atom.

11. A process for breaking petroleum emulsions of the water-in-oil-type, which consists in subjecting the emulsion to the action of a demulsifying agent of the formula type:

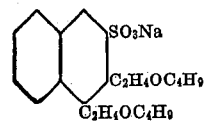

MELVIN DE GROOTE.